March 27, 1951          E. L. LEGRIS          2,546,268
ADJUSTABLE SEAT FOR FARM IMPLEMENTS
Filed Oct. 16, 1947
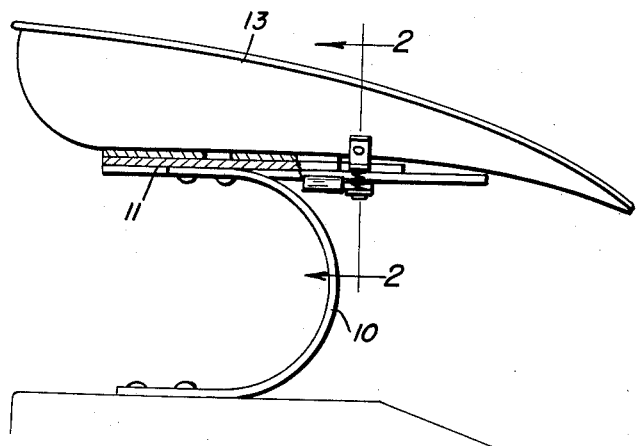
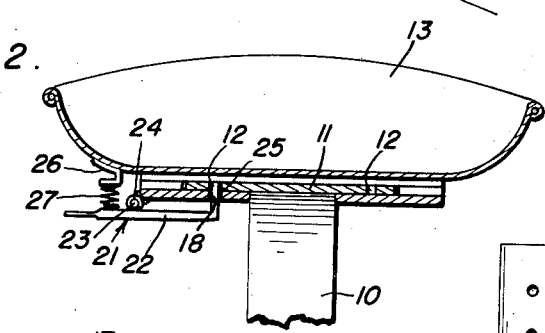
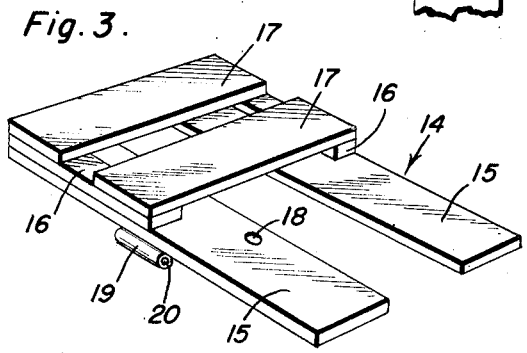
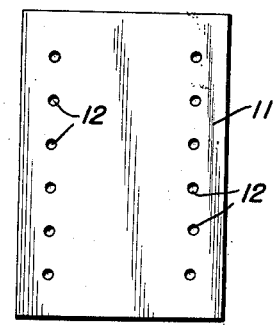
Edgar L. Legris
INVENTOR.
BY *Clarence A. O'Brien*
*and Harvey B. Jacobson*
Attorneys Patented Mar. 27, 1951

2,546,268

UNITED STATES PATENT OFFICE 2,546,268

ADJUSTABLE SEAT FOR FARM IMPLEMENTS

Edgar L. Legris, Kankakee, Ill., assignor of fifty per cent to Louis Legris, Kankakee, Ill.

Application October 16, 1947, Serial No. 780,122

2 Claims. (Cl. 155—14)

This invention relates to an adjustable seat for farm implements and more particularly for farm tractors upon which it is sometimes desirable to stand during the operation of the tractor.

The conventional farm tractor is equipped with a seat for the operator which usually is maintained in a fixed position near the control equipment of the tractor. Any adjustment of the seats of such tractors is usually obtained by the loosening of bolts and the shifting of the seat and then again tightening the bolts to hold the seat in the adjusted position. It frequently occurs that the operator of a tractor may wish to stand during the operation thereof and when such an occasion arises, the seat of the tractor seriously interferes with the operator remaining in a standing position and yet staying within easy reach of the tractor controls.

The primary object of this invention is to facilitate the movement of the tractor seat to a position in which it will not interfere with the operation of the tractor from the standing position.

Another object is to enable the seat to be shifted relative to the controls to a position convenient for the operation of the controls without employing tools of any kind.

The above and other objects may be attained by employing this invention which embodies among its features a frame mounted to slide longitudinally on the perforated seat supporting plate of a conventional seat support, a seat welded to the frame and a latch carried by the frame and adapted to cooperate with the perforations in the plate in holding the seat in various adjusted positions thereon.

In the drawings:

Figure 1 is a side view partially in section of a seat supporting frame embodying the features of this invention, Figure 2 is a transverse sectional view taken along the line 2—2 of Figure 1, Figure 3 is a perspective view of the adjustable frame, and Figure 4 is a plan view of the conventional seat plate to which the conventional implement seat is ordinarily bolted.

Referring to the drawings in detail, a somewhat resilient, generally U-shaped strap seat support 10 has riveted or otherwise attached thereto a conventional seat supporting plate 11 which is equipped adjacent opposite longitudinal edges with longitudinally spaced perforations 12. As illustrated in Figure 4, these perforations are arranged in spaced parallel rows and under ordinary circumstances, these perforations receive attaching bolts by which a conventional implement seat 13 is adjustably supported on the plate 11.

In employing this invention, the seat 13 is detached from the plate 11 and welded or otherwise fixed to a frame designated generally 14. This frame 14 comprises a pair of spaced parallel side bars 15 to which are affixed adjacent one end of the frame 14 spacers 16 which as illustrated in Figure 3 lie along opposite side edges of the side bars 15, and are of a thickness slightly in excess of the thickness of the plate 11. Transversely extending seat supporting bars 17 are welded or otherwise fixed to the upper sides of the spacers 16 and to these supporting bars 17 the seat 13 is welded or otherwise permanently attached. Formed in one of the side bars 15 intermediate its ends, and in a position to align with one row of perforations 12 is an opening 18 for the reception of the latch finger to be more fully hereinafter described. Welded or otherwise fixed to the bar 15 having the opening 18 therein along its outer side edge and intermediate its ends, is a barrel 19 having a longitudinal bore 20 which extends parallel with the longitudinal axis of the frame 14 and serves as a support for the latch to be more fully hereinafter described.

The latch above referred to is designated generally 21 and comprises a latch arm 22 intermediate the ends of which is welded or otherwise secured a pintle 23 which extends laterally and is adapted to be received in the bore 20 of the barrel 19. The end of the pintle 23 remote from the latch arm 22 is pierced to receive a cotter pin 24, and the end of the latch arm which approaches the longitudinal axis of the frame 14 is upturned to form a latch finger 25. This latch finger is operable through the opening 18 to enter one of the openings 12 in order to hold the frame 14 against longitudinal shifting movement on the plate 11. A suitable bracket 26 is welded or otherwise fixed to the seat 13 near the barrel 19 and this bracket supports at one end, one end of a compression coil spring 27, the opposite end of which bears against the lever 22, yieldingly to urge the latch pin 25 to enter an opening 12 which may align with the opening 18.

In use, the seat 13 as above described is welded to the frame 14 and the frame is then slipped into position over the plate 11 as illustrated in Figures 1 and 2. With the opening 18 in the frame 14 aligning with an opening 12 in the plate 11 it is obvious that the latch finger 25 will enter the opening 12 and prevent longitudinal shifting movement of the frame and seat relative to the plate. Should it be desired to release the latch finger and slide the seat backwardly out of the way to permit the operator to stand during the operation of the tractor, it is only necessary to exert pressure on the latch arm 22 at the end remote from the finger 25 to compress the spring 27 and extract the finger 25 from the opening 12. Such extraction of the finger will free the frame 14 to slide longitudinally of the plate until the desired position of the seat is found. When the desired position of the seat is reached, the latch finger is entered into the nearest opening 12 and the seat will thus be held in the desired position and against further longitudinal movement with relation to the plate 11.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. An adjustable seat for use with a rectangular seat plate of the type having a plurality of apertures regularly spaced along one side thereof, said seat including a frame comprising a pair of spaced parallel guide members, one of said members being formed with a vertical opening registrable with the perforations in the seat plate, said members being adapted to slidably engage the underside of the plate, a pair of spaced parallel spacers superimposed on the upper faces of the guide members adjacent their outermost edges, a pair of spaced transversely extending parallel seat supporting plates secured to the upper faces of the spacers, a seat secured on the last-mentioned plates, a latch pivoted to one of the members and having a locking end engageable in the opening in the member and selectively registrable in the perforations in the seat plate for holding the frame and seat in various positions thereon, said latch projecting beyond the member and resilient means anchored between the underside of the seat and the latch for yieldingly urging said locking end into locking engagement in the seat plate.

2. A seat assembly comprising a seat supporting strap, a rectangular seat plate secured on said strap and having a plurality of apertures regularly spaced along one side of the plate, a frame comprising a pair of spaced parallel guide members, one of said members being formed with a vertical opening registrable with the perforations in the seat plate, said members being adapted to slidably engage the under side of the plate, a pair of spaced parallel spacers superimposed on the upper faces of the guide members adjacent their outermost edges, a pair of spaced transversely extending parallel seat-supporting plates secured to the upper faces of the spacers, a seat secured on the last-mentioned plates, and a latch pivoted to one of the members and having a locking end engageable in the opening in the member and selectively registrable in the perforations in the seat plate for holding the frame and seat in various positions thereon, said latch projecting beyond the member, and resilient means anchored between the under side of the seat and the latch for yieldingly urging said locking end into locking placement in the seat plate.

EDGAR L. LEGRIS.

REFERENCES CITED

The following references are of record in the file of this patent:

UNITED STATES PATENTS

| Number | Name | Date |
| --- | --- | --- |
| 717,949 | Travis | Jan. 6, 1903 |
| 1,383,077 | Cole | June 28, 1921 |
| 1,390,865 | Bangee | Sept. 13, 1921 |